April 18, 1967  M. G. THASSY  3,314,496
POWER STEERING MECHANISM
Filed April 28, 1965  3 Sheets-Sheet 3

Inventor:
Michael G. T'hassy
By: Robert B. Gin
Attorney ered Apr. 18, 1967

United States Patent Office 3,314,496

3,314,496
POWER STEERING MECHANISM
Michael Gabriel Thassy, Chicago, Ill., assignor to International Harvester Company, Chicago, Ill., a corporation of New Jersey
Filed Apr. 28, 1965, Ser. No. 451,391
11 Claims. (Cl. 180—79.2)

The present invention relates to improved power steering mechanisms designed for wide angle turns. The invention is particularly adapted for use with a trailer and two-wheel tractor combination of the heavy duty or earth-moving type.

This heavy duty type of power steering mechanism is actuated by two hydraulic cylinders, preferably double acting, so that one pushes when the other pulls and vice versa, each cylinder acting on a steering arm through suitable mechanism. The element to which the cylinder is actually connected is known as a steering lever.

In prior art arrangements, the steering lever is a true lever, being pivotally connected at one end to the reference device on which the cylinder is mounted, e.g., the trailer. Furthermore, the point of connection between the cylinder rod and the steering lever is an intermediate point on the steering lever. The other end of the steering lever is connected by a connecting link to the nonreference device, e.g., the tractor, which constitutes the output element or steering arm.

Since it is desired in earth-moving equipment to provide a steering angle of up to 90° in either direction, the output force multiplied by its arm to the pivot, which connects the tractor and the trailer, referred to herein as the steering torque, drops off very rapidly as the steering angle approaches 90°. This is best visualized by a consideration of the velocity ratio, namely the linear displacement of the force applying means, such as the piston of the actuating cylinder, per degree of steering turn. This velocity ratio is a rough measure of mechanical advantage, disregarding frictional losses.

This rapid decrease of mechanical advantage per increment of angular output is characteristic of various piston and crank arrangements, and can be referred to as an "inverse harmonic characteristic."

It is an object of the present invention to provide a power steering mechanism in which this undesirable inverse harmonic characteristic is greatly reduced, or modified, to the end that a more uniform mechanical advantage, or velocity ratio, obtains throughout the whole steering range of up to 90° in either direction.

According to my invention, the steering lever, instead of being a true lever which is pivotally mounted on the reference device, is a floating element, such as the connecting link of a four-element linkage of which one link is the steering arm. Thus the actuating force is applied to a floating element which in turn is connected directly to the steering arm. Furthermore, the floating element is a type of bell crank lever which is arranged in such a manner that its velocity ratio increases so as to offset the decrease in the velocity ratio of the linkage at or beyond the 45° point.

Furthermore, by applying the actuating force to the connecting link of the linkage instead of to a pivoted link, considerable latitude of design is provided to the end that the velocity ratio of the link motion can be better controlled.

Also, a more compact mechanism can be provided since it is possible to operate the linkage through an over center position.

Other objects, features and advantages will become apparent as the description proceeds.

With reference now to the drawings in which like reference numerals indicate like parts:

Figure 1:
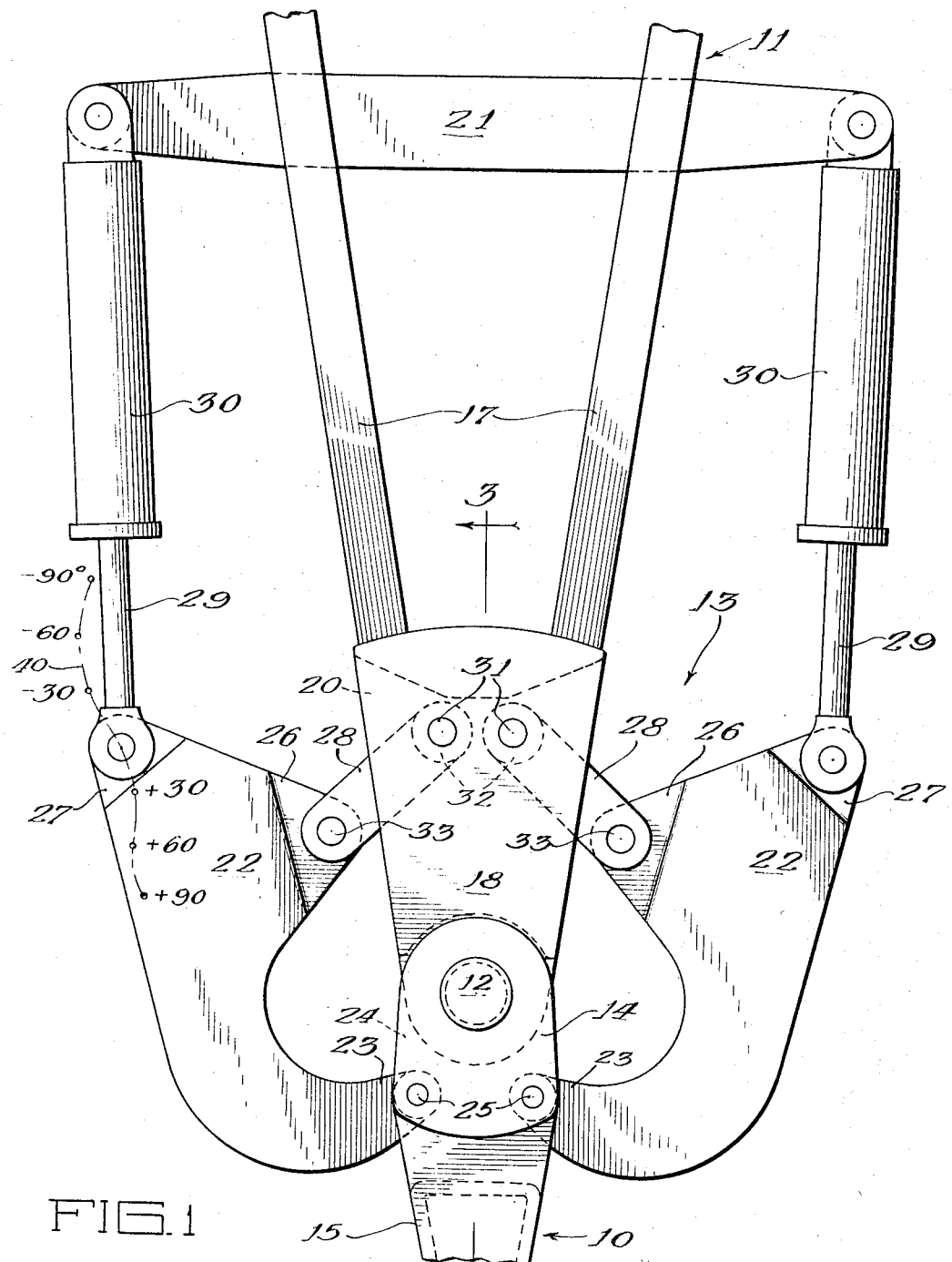
FIG. 1 is a plan view of a preferred embodiment of my improved steering mechanism as applied to the connecting structure between a tractor and a trailer.
Figure 2:
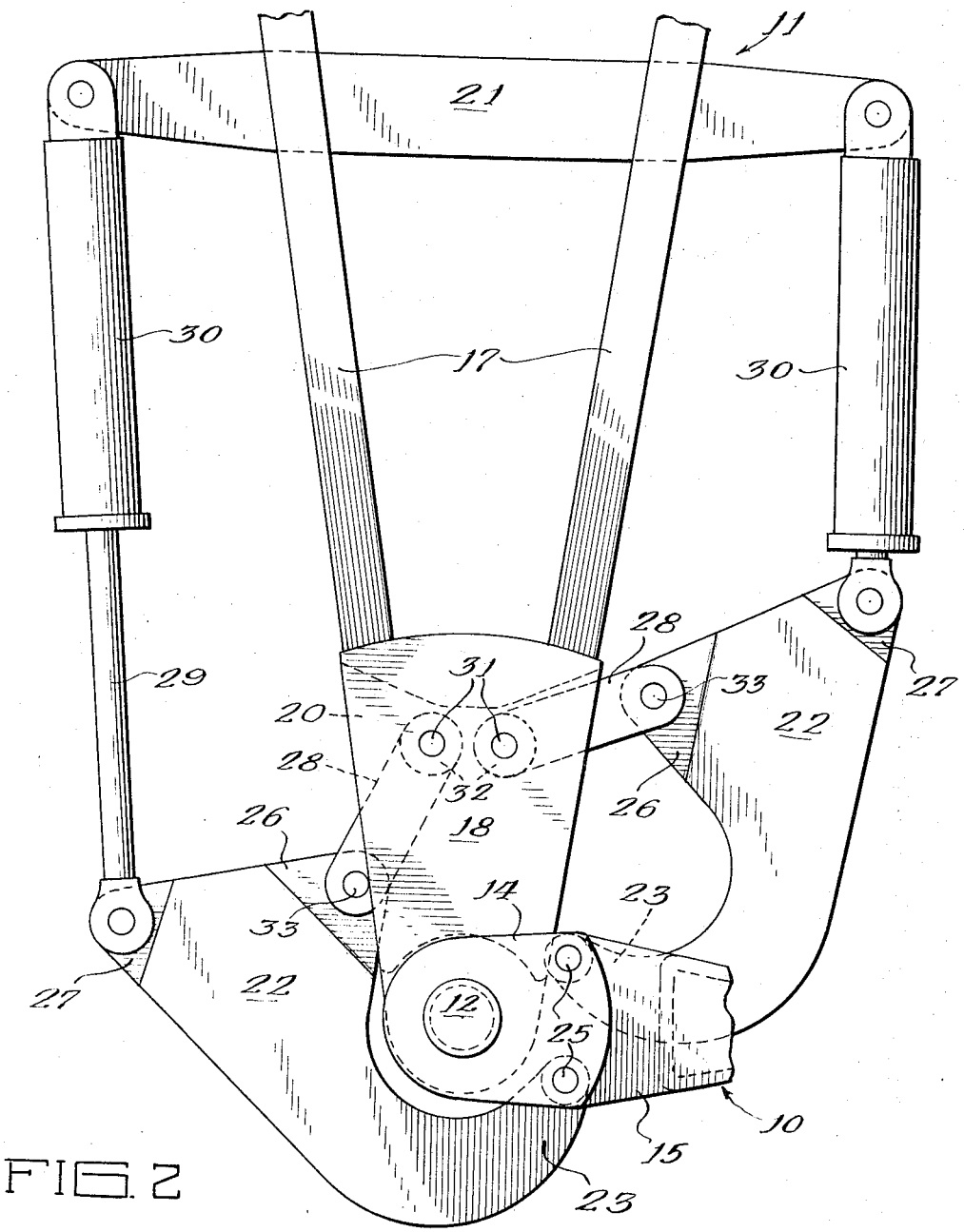
FIG. 2 is a plan view similar to FIG. 1 but showing the parts in a changed position.

In FIGS. 1 and 2 the tractor is represented by the so-called fifth wheel 10, and the trailer by the gooseneck 11 these forming a part of the connecting structure although the tractor itself and the trailer itself are not shown. The fifth wheel 10 and gooseneck 11 are connected by a king pin 12 which permits relative rotation about a vertical axis. In the embodiment shown, the steering linkage mechanism 13 is mounted on the gooseneck 11, but it could also be mounted on the fifth wheel 10 without changing the mode of operation.

The fifth wheel 10 comprises a clevis 14 which includes a body member 15.

Figure 3:
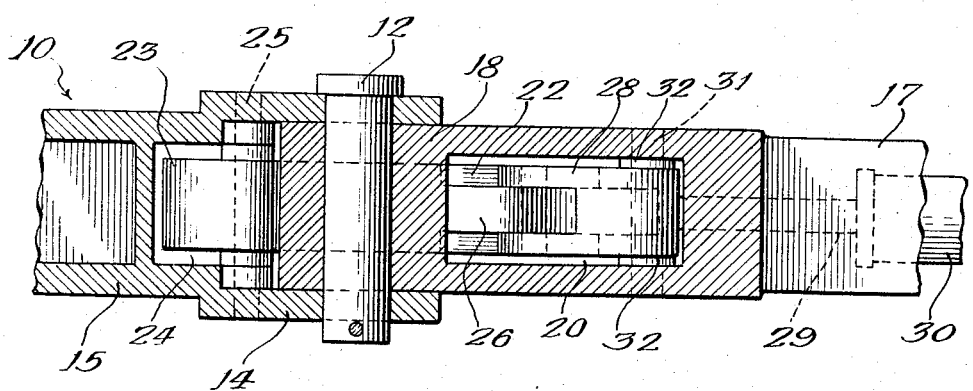
FIG. 3 is a vertical section taken along line 3—3 of FIG. 1 showing the pivot connections of the bell crank link.

The gooseneck 11 comprises a pair of longitudinally disposed beams 17 which converge forwardly and support at the front end the king pin bearing block 18, provided with a recess 20, as shown in FIG. 3 to accommodate strut links 28, pivot pins 31, and spacing washers 32. A transverse cylinder support bar 21 is suitably secured to the beams 17.

The steering mechanism includes a steering lever in the form of a bell crank lever 22 having an end 23 which extends into a recess 24 formed in the clevis body 15 and which is pivotally connected thereto by a pivot pin 25 and suitable spacing washers, there being two of such bell crank levers 22. Each bell crank lever 22 also includes an ear 26 for connection to the strut link 28 by a pivot pin 33, and a yoke 27 for connection to the piston 29 of a cylinder by a suitable pivot pin.

The cylinders 30 are pivotally anchored at one end on the cylinder support bar 21 and react against the support bar 21 as the piston 29 displaces the bell crank 22 from the FIG. 1 position to the FIG. 2 position incident to the extension of the cylinder. Thus the clevis 14, which in the environment shown can be considered as the steering arm, is rotated into an extreme position.

The hinged connection between the steering arm 14 and the gooseneck 11, 18 permits pivotal movement of one with respect to the other between a normal or straight ahead position as shown in FIG. 1, and either one of two extreme positions, one of which is shown in FIG. 2. For the purpose of explanation, the FIG. 2 position will be considered as a positive angular displacement with respect to the left hand cylinder, the term positive being associated with the extension of the reference cylinder. Thus the FIG. 2 extreme position is at the same time a negative displacement with respect to the right hand cylinder which at this time is contracted.

Figure 4:
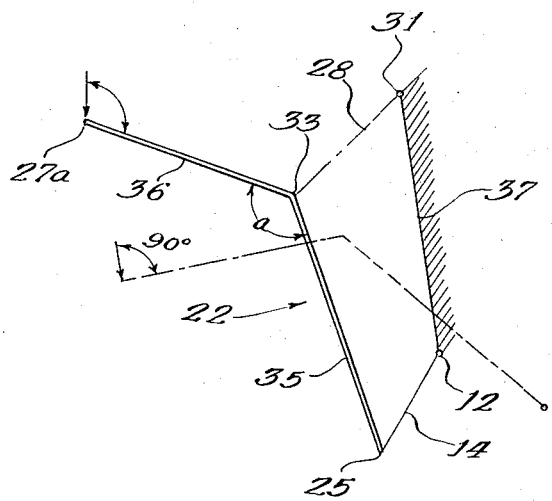
FIG. 4 is a diagram illustrating the operation.

For purpose of explanation, reference is made to the diagram of FIG. 4 in which the bell crank lever 22 is shown as having a first lever arm 35, connected to the steering arm 14 at point 25, and a second lever arm 36 which is connected to the piston 29, not shown, at point 27a. The point 33 can be referred to as the fulcrum of the lever, and this is connected to the strut 28.

The line 37 connecting points 31 and 12 represents a base link which corresponds to the gooseneck 11. Thus the lines 37, 28, 35 and 14, constitute a four element linkage of which 37 is the base link, 28 and 14 are the cranks, and 35 is the connecting link, with the radii of the various links being the distance between their respective ends;

as for example, the radius of the steering arm 14 being the distance between point 12 and point 25. By selection of suitable link lengths a motion can be imparted to the connecting link 35 which is a combination of rotation and translation.

The obtuse angle *a* between the first and second lever arms 35 and 36 is preferably such that when the parts are in the extreme positive position, the angle between the second lever arm 36 and the cylinder axis is substantially 90° (referred to as the crank angle at 27*a*). Thus, the velocity ratio of the bell crank itself increases in a manner which offsets the decrease of velocity ratio occasioned by the linkage.

The obtuse angle *a* is subject to considerable design variation between 90° and 180°, depending upon the orientation of the cylinders 30 and the link proportions. However, for the purpose of compactness, it is considered preferable to dispose the cylinders 30 substantially parallel to each other in which event the angle *a* would be about 130° for the link proportions shown.

To summarize the foregoing, the second lever arm 36 is so located that the crank angle at 27*a* decreases down to or slightly through the 90° position as the cylinder and steering arm 14 are displaced from the normal position up to the extreme positive position. Thus, the velocity ratio at point 27*a* of the piston with respect to the rotational component of the bell crank lever 22 will be an increasing velocity ratio. This offsets the decreasing velocity ratio at point 25 of the translational component of the bell crank lever with respect to the steering arm 14. The effectiveness of this arrangement is indicated by the curve 40 of FIG. 1 which shows the locus of point 27*a* as it moves from the minus 90° turn position through the 0° and into the plus 90° turn position. The substantial straightness of this curve 40 and the substantial uniformity of the 30° increments shown indicate a substantially uniform overall velocity ratio of the mechanism as a whole.

The arrangement could be described as a floating bell crank lever in which both the rotational component and the translational component are utilized to obtain a substantially uniform velocity ratio.

Another feature of the invention is indicated in FIG. 4 in which it will be seen that the extreme position of the first lever arm 35 of the bell crank lever 22 is an over center position with respect to the axis of the king pin 12. The fact that the mechanism permits operation of the linkage through an over center position permits a more compact construction. It will be observed from FIG. 2 that the bell crank 22 is hook-shaped at one end so as to avoid interference with the king pin bearing 18 as the linkage moves into and through this over center position.

Although a preferred embodiment of the present invention has been described herein, it will be understood that various modifications and changes may be made in the construction shown without departing from the scope of the invention as pointed out in the appended claims.

I claim:

1. Steering mechanism for the fifth wheel-gooseneck connection of a trailer-two-wheel tractor combination comprising a supporting frame, a steering arm pivotally connected with said frame, a pair of hydraulic cylinders having one end anchored to said frame, two levers, each having its ends pivotally connected to and extending between the other end of one of said cylinders and said steering arm, each lever having a fulcrum point, and two struts, each strut pivotally connecting a fulcrum point to said supporting frame.

2. Steering mechanism for the fifth wheel-gooseneck connection of a trailer-two-wheel tractor combination comprising a supporting frame, a steering arm pivotally connected with said frame, a hydraulic cylinder having one end anchored to said frame, a bell crank lever having its ends pivotally connected to and extending between the other end of said cylinder and said steering arm, said bell crank lever having a fulcrum point and first and second lever arms, and a strut pivotally connecting said fulcrum point to said supporting frame, the angle between said first and second lever arms being substantially greater than 90°.

3. Steering mechanism for the fifth wheel-gooseneck connection of a trailer-tractor combination comprising a supporting frame, a steering arm pivotally connected with said frame and movable between a normal position and an extreme position, a hydraulic cylinder having one end anchored to said frame, a bell crank lever having a first lever arm pivotally connected to said steering arm and a second lever arm pivotally connected to the other end of said cylinder, said bell crank lever having a fulcrum point, and a strut pivotally connecting said fulcrum point to said supporting frame, the angle between said second lever arm and the axis of said cylinder being greater than 90° when said steering arm is in its normal position and reducing to substantially 90° as said steering arm rotates into an extreme position so that the velocity ratio of said cylinder with respect to said bell crank lever will increase to offset the reduction in the velocity ratio of said bell crank lever with respect to said steering arm.

4. Steering mechanism as claimed in claim 3 in which the angle between said first and second lever arms is substantially greater than 90°.

5. Steering mechanism as claimed in claim 3 in which the angle between said first and second lever arms is substantially 130°.

6. Steering mechanism as claimed in claim 3 in which said strut is longer than the radius of said steering arm.

7. Steering mechanism as claimed in claim 3 in which said first lever arm is hook-shaped.

8. Steering mechanism for the fifth wheel-gooseneck connection of a trailer-tractor combination comprising a supporting frame, a steering arm pivotally connected with said frame and movable between a normal position and an extreme position, a hydraulic cylinder having one end anchored to said frame, a bell crank lever having a first lever arm pivotally connected to said steering arm and a second lever arm pivotally connected to the other end of said cylinder, said bell crank lever having a fulcrum point, and a strut pivotally connecting said fulcrum point to said supporting frame, whereby said strut and said steering arm constitute the cranks of a four-element linkage, and said first lever arm constitutes the connecting link thereof, said linkage providing for said bell crank lever a rotational component which is in the same direction as the rotation of said cranks, the angle between said second lever arm and said cylinder axis being greater than 90° when said steering arm is in its normal position and the velocity ratio of said cylinder with respect to the rotational component of said bell crank lever, as said steering arm rotates into an extreme position, increasing to offset the reduction in the velocity ratio of the translational component of said bell crank lever with respect to said steering arm.

9. Steering mechanism as claimed in claim 8 in which said first lever arm is substantially the same length as the distance between the pivoted connection between the strut and frame and the pivoted connection between the steering arm and frame, and in which said strut is longer than the radius of said steering arm.

10. Steering mechanism for the fifth wheel-gooseneck connection of a trailer-two-wheel tractor combination comprising a gooseneck, a fifth wheel, a king pin pivotally connecting with said gooseneck and said fifth wheel, a pair of hydraulic cylinders having one end pivotally anchored to said gooseneck, two levers, each lever having its ends pivotally connected to and extending between the other end of one of said cylinders and said fifth wheel, each lever having a fulcrum point, and two struts, each strut pivotally connecting a fulcrum point to said gooseneck.

11. Steering mechanism for the fifth wheel-gooseneck connection of a tractor-trailer combination comprising a gooseneck including a king pin bearing structure, a fifth-wheel, a king pin extending into said bearing structure and pivotally connecting said gooseneck and said fifth wheel, and permitting relative steering movement of substantially 90° of turn in either direction from a normal position, a pair of hydraulic cylinders each having one end pivotally anchored to said gooseneck, a bell crank lever for each cylinder having a first lever arm pivotally connected to said fifth wheel, a second lever arm pivotally connected to the other end of said cylinder, and a fulcrum point, two struts, each strut pivotally connecting the fulcrum point of one bell crank lever to said gooseneck structure, the pivotal connection between said first lever arm and said fifth wheel being so located that when said fifth wheel is in one of said 90° turn positions, said first lever arm is in an over center position with respect to the axis of said king pin, said first lever arm being hook-shaped so as to avoid interference with said king pin bearing structure as said bell crank lever and said fifth wheel moves into and through said over center position.

References Cited by the Examiner

UNITED STATES PATENTS

| | | | |
|---|---|---|---|
| 2,638,998 | 5/1953 | Rockwell | 180—79.2 |
| 3,122,850 | 3/1964 | Rockwell | 180—79.2 |

FOREIGN PATENTS 1,277,011  10/1961  France.

MILTON BUCHLER, *Primary Examiner.*

BENJAMIN HERSH, *Examiner.*

J. H. BRANNEN, *Assistant Examiner.*